United States Patent
Li

(10) Patent No.: US 9,328,282 B2
(45) Date of Patent: May 3, 2016

(54) RECYCLABLE CLEANOUT FLUIDS

(75) Inventor: Leiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 686 days.

(21) Appl. No.: 13/530,295

(22) Filed: Jun. 22, 2012

(65) Prior Publication Data

US 2013/0000916 A1  Jan. 3, 2013

Related U.S. Application Data

(60) Provisional application No. 61/502,407, filed on Jun. 29, 2011.

(51) Int. Cl.
| | | |
|---|---|---|
| *E21B 21/06* | (2006.01) | |
| *E21B 37/06* | (2006.01) | |
| *C09K 8/52* | (2006.01) | |
| *C09K 8/32* | (2006.01) | |

(52) U.S. Cl.
CPC ... *C09K 8/52* (2013.01); *C09K 8/32* (2013.01); *E21B 21/065* (2013.01); *E21B 37/06* (2013.01)

(58) Field of Classification Search
CPC ...... C09K 8/68; C09K 2208/30; C09K 8/685; C09K 2208/26; C09K 8/74; C09K 8/602; C09K 8/72; C09K 8/524; E21B 43/26; E21B 43/267; E21B 43/25; E21B 43/16; E21B 33/13; E21B 43/261
See application file for complete search history.

(56) References Cited

U.S. PATENT DOCUMENTS

| | | | | |
|---|---|---|---|---|
| 5,948,735 | A * | 9/1999 | Newlove et al. | 507/238 |
| 7,521,400 | B2 | 4/2009 | Samuel | |
| 7,560,418 | B2 * | 7/2009 | Bell et al. | 507/128 |
| 7,950,459 | B2 | 5/2011 | Sullivan et al. | |
| 2001/0007351 | A1 * | 7/2001 | Acker et al. | 250/307 |
| 2005/0233911 | A1 * | 10/2005 | Samuel | 507/238 |
| 2011/0030953 | A1 | 2/2011 | Li et al. | |
| 2011/0100633 | A1 | 5/2011 | Ghesner et al. | |

FOREIGN PATENT DOCUMENTS

MX  PA06011847 A  1/2007

OTHER PUBLICATIONS

Second Office Action issued in MX/A/2012/007686 on Nov. 4, 2014, 6 pages.

* cited by examiner

*Primary Examiner* — Zakiya W Bates
(74) *Attorney, Agent, or Firm* — Matthieu Vandermolen; Rachel E. Greene; Tim Curington

(57) ABSTRACT

A method for treating a wellbore or a subterranean formation penetrated by a wellbore includes preparing a gelled oil at the surface, introducing the gelled oil into the wellbore, recovering the gelled oil at the surface, adding a base to the gelled oil to reduce the viscosity, allowing entrained solids to settle out, adding an acid to increase the viscosity, and re-injecting the gelled oil.

15 Claims, No Drawings

RECYCLABLE CLEANOUT FLUIDS

CROSS REFERENCE TO RELATED APPLICATIONS

The current application claim benefit and priority of U.S. Provisional Patent Application No. 61/502,407, filed on Jun. 29, 2011, the entire content of which is incorporated herein by reference in its entirety.

BACKGROUND

The statements in this section merely provide background information related to the present disclosure and may not constitute prior art.

Material that has accumulated in a wellbore before or during completion is often called wellbore fill; it may be sand, proppant, cement chunks, or other materials. Such materials hinder or prevent operations. Sand accumulated in production tubing in a wellbore at the start of or during production can greatly hinder production. Coiled tubing has been widely used as a means to clean out the wellbore or production tubing in these situations and to remove wellbore fill. Such cleanout operations utilize fluids pumped down the wellbore through the coiled tubing to pick up solid particles and then to transport the particles back to the surface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, there is a method of treating a wellbore or a subterranean formation penetrated by a wellbore including the steps of preparing a gelled oil at the surface, performing a first cycle including a series of steps including injecting the gelled oil into a well, recovering the gelled oil at the surface, reducing the viscosity of the gelled oil by adding a first pH-adjusting agent, treating the gelled oil having reduced viscosity, increasing the viscosity of the gelled oil by adding a second pH-adjusting agent, and starting a second cycle by re-injecting the gelled oil into the well. In various embodiments, the injection is through coiled tubing; the gelled oil is made with a hydrocarbon mixture, a gelling agent, and a crosslinking agent; the treatment is wellbore cleanout; the treatment is drilling; the step of treating the gelled oil having reduced viscosity is a method of removing solids from the gelled oil having reduced viscosity; the first pH-adjusting agent is a base or mixture of bases; the second pH-adjusting agent is an acid or mixture of acids; the gelled oil is made with (a) diesel, (b) a phosphate ester and (c) a ferrous compound, a ferric compound or an aluminum carboxylate; and the step of increasing the viscosity of the gelled oil includes adding a gelling agent, a crosslinking agent, or both.

In some embodiments, there is a method of cleaning out a wellbore penetrating a subterranean formation comprising injecting a gelled oil into the wellbore, entraining a solid from the wellbore, recovering the gelled oil at the surface, removing the solid from the gelled oil by adding a first pH-adjusting agent to reduce the viscosity of the gelled oil, increasing the viscosity of the gelled oil by adding a second pH-adjusting agent, and re-injecting the gelled oil into the well. In various embodiments, the injection is through coiled tubing; the gelled oil is made with a hydrocarbon mixture, a gelling agent, and a crosslinking agent; the treating the gelled oil having reduced viscosity is a method of removing solids from the gelled oil having reduced viscosity; the first pH-adjusting agent is a base or mixture of bases; the second pH-adjusting agent is an acid or mixture of acids; the gelled oil is made with (a) diesel, (b) a phosphate ester and (c) a ferrous compound, a ferric compound or an aluminum carboxylate; and the step of increasing the viscosity of the gelled oil includes adding a gelling agent, a crosslinking agent, or both.

In some embodiments, there is a wellbore cleanout fluid comprising a gelled oil with variable viscosity depending on pH. In various embodiments, the gelled oil may comprise a hydrocarbon mixture, a gelling agent, and a crosslinking agent; the wellbore cleanout fluid may comprise (a) diesel, (b) a phosphate ester and (c) a ferrous compound, a ferric compound or an aluminum compound.

DETAILED DESCRIPTION

It should be noted that in the development of any actual embodiments, numerous implementation-specific decisions may be made to achieve the developer's specific goals, for example compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments and should not be construed as a limitation to the scope and applicability. Embodiments may be described in terms of treatment of vertical wells, but are equally applicable to wells of any orientation. Embodiments may be described for hydrocarbon production wells, but it is to be understood that embodiments may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor appreciates and understand that any and all data points within the range are to be considered to have been specified, and that the inventor has possession of the entire range and all points within the range.

The statements made in this paragraph merely provide information related to the present disclosure and may not constitute prior art, and may describe some embodiments illustrating the claimed subject matter. Water-based treatment fluids can damage some wellbores and formations; embodiments described relate to oil-based fluids having recyclable viscosity and their use in oilfield treatments. More particularly, they relate to compositions and methods for cleaning debris from wellbores and wellbore tubing. Even more particularly, they relate to methods and compositions for recycling a gelled hydrocarbon fluid used in such coiled tubing cleanout operations. The recyclable gelled oil fluid is particularly suitable for coiled tubing cleanout applications because the gelled oil is still quite clean when it flows back. The recyclable gelled oil is suitable for other applications too such as frac jobs. To be effective at entraining and carrying solid particles, fluids used in cleanout operations are often viscosified. Most typically, however, these viscosified fluids are discarded after a single trip through the well because removal of the entrained solids from the fluid either requires a long settling time or the addition of a chemical breaker to reduce the fluid viscosity. Additional requirements for fluids used for wellbore fill removal, more particularly coiled tubing cleanout, include low friction pressure and good particle carrying capability. Some crosslinked polymer gels are not used as viscosifiers for cleanout fluids because they do not have appropriate viscoelastic properties for suspending the particles so that they can be transported.

Gelled oil can be used for wellbore or production tubing cleanout with coiled tubing, the viscosity of the baseline gelled oil can then be reduced to a nearly water-like value (from about 1 cP to about 10 cP is suitable) to drop out the entrained solids by sufficiently increasing the pH (the amount of base and the necessary pH depend upon many factors, including the nature of the components, their concentrations, the mixing energy, the size, shape, concentration and density of the suspended solids, the extent to which the solids must be removed, and the temperature), and the gelled oil can then regain most of the original viscosity if the pH is then decreased to close to its original value. Suitable bases that may be used to increase the pH include, but are not limited to, sodium hydroxide, potassium hydroxide, sodium carbonate, potassium carbonate, ammonium hydroxide, and others; non-limiting examples of suitable acids for regenerating the lost viscosity include hydrochloric acid (HCl), sulfuric acid, formic acid, acetic acid, lactic acid, citric acid, and others. Note that for simplicity I may describe adding an acid or base to a hydrocarbon mixture as changing the pH, even though the mixture, and optionally the acid and/or base, may initially contain no water. Dilution, especially by water, may reduce the viscosity of gelled oils, so changes in pH may be brought about by solid or concentrated acids or bases as much as possible to increase the number of cycles in which a given batch of gelled oil may be used. For water-sensitive gelled oils, non-aqueous pH-adjusters, for example alkali metal alkoxylate in the corresponding alcohols may be used.

The gelled oil, as described here, can be used as the carrier fluid for coiled tubing cleanout jobs, for example before or after completion or cementing, or for removal of particulates (such as proppant or formation sand) after stimulation or during production. To pick up and carry wellbore fill, the gelled oil needs to be sufficiently viscous. The necessary viscosity depends upon the gelled oil flow rate (pumping rates) or concentration of sand/proppant/gravel; lower flow rates or higher fill concentration and/or densities require greater viscosity. Once the fill is transported to the surface, for optimal efficiency the fill should be separated quickly from the carrier fluid. If the gelled oil still has high viscosity, it will be difficult to separate the fill from the gelled oil. When the pH is adjusted, the gelled oil is quickly broken into a low-viscosity water-like or close to water-like liquid, and the fill quickly precipitates to the bottom of the broken gelled oil due to gravity, and can be easily collected and removed. Once the fill is separated and removed, an acid, for example HCl, is added, and the broken gelled oil changes back into a viscous gelled oil, and can be recycled and used in the cleanout job again. This way, there is provided a recyclable or reusable carrier fluid.

The base gelled oil fluids are substantially or entirely hydrocarbons. In some embodiments, the base fluid is diesel, which is typically a mixture of aromatics and saturated and unsaturated aliphatics, and which may contain trace amounts of compounds containing oxygen, sulfur, and nitrogen. Other suitable base fluids include, for example, kerosene, paraffinic oil, ether, crude oil, condensate, toluene, xylene, and mineral oil, biodiesel, limonene and mixtures thereof. Compared with aqueous crosslinked polymers, gelled oil systems use fewer additives, usually are expected to be insensitive to pH, and cause less damage to formations because they contain no polymers. The hydrocarbon is gelled with a gelling agent (for example an organic carboxylate, a phosphate ester, for example an alkyl phosphate ester) and a crosslinking agent (sometimes called an activator), such as certain aluminum or ferric or ferrous compounds (for example a metal carboxylate, for example an aluminum carboxylate, or a ferric ammonium citrate or ferric alkylamine citrate). Optionally, the oil may be gelled with an aluminum salt of a phosphate ester; or a polyvalent metal salt of an organophosphonic acid ester or a polyvalent metal salt of an organophosphinic acid; or a polyvalent metal salt of an organophosphonic acid ester or a polyvalent metal salt of an organophosphonic acid. Gelled oils, gelling agents and crosslinkers or activators, and batch and continuous methods of preparing suitable gelled oils, are well known to those of skill in the art of subterranean reservoir treatment.

A fiber component may be included in the gelled oil fluids used in the current disclosure to achieve a variety of properties including improving particle suspension, and particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures of these. Other examples of useful fibers include, but are not limited to, polylactic acid polyester fibers, polyglycolic acid polyester fibers, polyvinyl alcohol fibers, and the like. Fibers will attach to proppants or particles and drop out with them, aiding their removal; fresh fibers are added in each cycle.

The gelled oil fluids may additionally contain a viscoelastic surfactant (VES), for example as described in U.S. Pat. No. 7,521,400 to provide an increase in viscosity or an enhancement in other fluid properties, for example mitigating the water damage to aluminum-crosslinked gelled oils, which are known to be sensitive to water contamination. The VES may be selected from the group consisting of cationic, anionic, zwitterionic, amphoteric, and nonionic surfactants and combinations of these.

In embodiments, gelled oils may include other additives and chemicals that are known by those skilled in the art to be commonly used in oilfield applications. These include, but are not necessarily limited to, materials in addition to those mentioned above, such as oxygen scavengers, alcohols, surfactants, co-surfactants, scale inhibitors, corrosion inhibitors, fluid-loss additives, bactericides, organic solvents, and the like. Gelled oils used may be energized or foamed; fluorocarbon surfactants are generally used when foaming of gelled hydrocarbons is required.

In addition to wellbore cleanout, gelled oils are used as the treatment fluid in hydraulic fracturing, and in sand control treatments such as gravel packing and frac packing. They are used as diverters, for example in acid fracturing, where they are pumped in stages alternating with acids or retarded acids such as emulsified acids. They are used as fluid loss control fluids, kill fluids, and lost circulation fluids with or without added solids, including fibers. They are used as oil based drilling fluids and are compatible with fibers, CaCO3, barite, hematite and other weighting agents. They are used over a broad temperature range. They are used to make stable slurries of solid additives. After the use of any fluids, but especially gelled oils, in many of these applications, including remedial treatments, in cases in which solids are left in the wellbore (or in surface or subsurface equipment or lines), it may be appropriate to use a recyclable gelled oil system to remove the solids from the wellbore or elsewhere. Gelled oils are also used outside of wellbores, for example as slugs, or "pigs" for cleaning out coiled tubing, or surface or seafloor pipelines or conduits. Gelled oils are also used outside the oilfield (for example in pharmaceuticals, in cosmetics, for protection of electrical devices and optical cables), and in some applications (for example cleaning equipment after manufacture) recyclable gelled oils may be useful.

A typical conservative coiled tubing (CT) cleanout with recyclable gelled oil is conducted as follows. The well, for example approximately 1850 m (approximately 6070 feet) deep, is completed with perforated 7.30 cm (2⅞ inch) tubing, and 67 m (220 feet) of solids must be cleaned out. 3.8 Cm (1½) CT is used. The CT is filled with diesel and run in hole without circulating. The well is then opened to flow at about 0.69 MPa (100 psig) above the trunkline pressure; washing the fill is started while advancing the CT and circulating diesel to a depth about 15.2 m (50 feet) below the top of the fill; the tubing is pulled to about 6.1 m (20 feet) above the perforations; and diesel circulation is stopped and the well is shut in for about 30 minutes. The CT is run in without circulating to about 3.05 meters (about 10 feet) above the fill; the well is opened, and about 5675 liters (about 1500 gallons) gelled oil, optionally with the last third foamed, is circulated while moving the CT up and down about every 7.6 m (25 feet) to prevent sand settling and allowing the CT to become stuck. The gelled oil, and optionally foamed gelled oil, steps are repeated until no sand is being recovered over the interval to be cleaned; then diesel, optionally containing pH-raising breaker, is circulated; then the CT is pulled out of the hole while circulating diesel. In a less conservative method, the CT is not reciprocated. In an even more aggressive method, only foamed gelled oil is used. The simplest method is gelled oil only.

Regarding drilling fluids: conventional oil-based muds (OBM's) give better gauged holes (with less washout) and undergo less reaction with formations and so create less formation damage than water-based muds. Among the limitations of OBM's however are that they require several additives; they undergo settling at high temperatures; they are expensive; and they have handling issues. On the other hand, recyclable gelled oil drilling fluids require fewer additives; are more predictable; are less expensive; have better suspension characteristics; suffer less loss to formations (which is very important) because of their high low-shear viscosities; are compatible with $CaCO_3$, barite and hematite and can be weighted as much as required; are compatible with fibers; are compatible with fluid loss additives; and give no solids settling and thus it is easy to achieve heavy (high density) systems.

Recyclable gelled oils may be used for organic or inorganic scale removal, as perforation fluids, and as gel pigs. Recyclable gelled oil fluid systems can be used to dissolve and remove organic and inorganic deposits, particularly in wellbores, although also in pipelines, tools, and in many other places. They may be used in an analogous manner in industrial cleaning. In this use they may contain various additives such as paraffin or asphaltene inhibitors, and paraffin or asphaltene dispersing agents, and the base oil may advantageously be kerosene, xylene or toluene. The most common targets in the oilfield are asphaltene and paraffin (wax) deposits. Such deposits may also be mixed with inorganic deposits (scales) and in that case the gelled oil dissolver and remover may contain a suitable chelating agent or other scale dissolvers. The viscosity of the systems helps to keep the loose scales in suspension. Because of the high viscosity of the systems they behave like slugs. They will therefore also sweep any debris from a wellbore or pipeline when used to dissolve and remove deposits; or they may be used to sweep out debris even in the absence of organic or organic/inorganic deposits. This system is also used to swap water and other liquid and/or semi solid materials from horizontal or deviated wells and pipelines. Recyclable gelled oil may also be used as a perforation fluid, i.e. the fluid within the casing during perforation. In all these cases, recyclable gelled oils may be returned to the surface, the solids may be removed, and the fluids may be re-gelled and then returned for re-use.

Fresh (unused) gelled oils may be mixed in the field, for example using batch mixing. In many cases, a fresh gelled oil is pre-made with, for example, diesel, a gelling agent, and a crosslinker at an off-site location, and then shipped to the location for coiled tubing cleanout or other jobs. Continuous mixing on-site or off-site may also be used. When a gelled oil flows back with "fill" in it, base may be added to the gelled oil while blending (or mixing, or agitating) the gelled oil in a pond, or in a container, for example a tank. When the gelled oil breaks, it thins to nearly the viscosity of water, and fill drops to the bottom. The fluid optionally may be allowed to stand for a period of time while the fill settles out. Most of the broken gelled oil (except for the bottom-most portion that contains the fill) is then transferred to a tank or mixer, and acid is added to re-viscosify the gelled oil (both batch and continuous mixing may be used for this step). Optionally, after the viscosity-reduction step, solids may be removed with a shale shaker or similar equipment. In order to maximize the number of cycles that may be performed, if desired, the amount of water added in the pH raising and lowering steps may be minimized by using concentrated or solid pH-adjusting agents, and the viscosity may optionally be measured, and optionally, in any repeat cycles, additional gelling agent or crosslinker (activator) or both, (that may be the same as or different from the initial gelling agent and crosslinker (activator) and if both are added may be added in the same relative concentration as initially used or a different relative concentration than initially used) may be added. This may be particularly important if aluminum-crosslinked phosphate ester gelled oils are contaminated with water during use (for example, if they are contaminated downhole by formation water or by water injected in previous treatments) it may not be worthwhile to reuse it.

Embodiments can be further understood from the following examples.

EXAMPLE 1

Gelled Oil Crosslinked with the Ferrous ($Fe^{2+}$) Compound

The baseline gelled oil (described in U.S. Patent Application Publication No. 20110030953) was prepared with #2 diesel oil, 8 gpt of an alkyl phosphate ester (1 gpt (gallons per thousand gallons)=0.1 vol % (volume percent)) gelling agent, and 16 gpt of a ferrous crosslinker solution. The phosphate ester was a mixture of PO(OR)(OR')(OR"), PO(OR)(OR')(OH), and PO(OR)(OH)$_2$, where the R, R', or R" group was derived from an alcohol and was a hydrocarbon group having from about 1 to about 30 carbon atoms that, for example, was a linear or branched alkyl, alkenyl, aryl, alkylaryl, arylalkyl, cycloalkyl, alkyl ether, aryl ether, alkyl aryl ether, or a mixture of these. The gelled liquid hydrocarbon treatment fluid had a concentration of more than about 250 mg/liter of the alkyl phosphate esters that had a molecular weight of less than about 350. The mixture was gelled in a 1 L Waring blender. The viscosity at room temperature (RT) (about 18 to about 24° C. (about 65 to about 75° F.)) was measured with a Fann 35 viscometer (using R1/B1/F1 setting, measured within 10 minutes of the vortex closure in the blender) to be:

171 cP at 170/s shear; 70 cP at 511/s shear.

Then 4 gpt of a 30 wt % NaOH solution was added to the baseline gelled oil while blending. The gelled oil quickly lost its viscosity in the blender, and changed from a gel to a thin liquid. The viscosity of the thin liquid at RT was measured with a Fann 35 to be:

15 cP at 170/s shear; 15 cP at 511/s shear (suggesting that it was a Newtonian liquid).

Then 10.5 gpt HCl (15 wt %) was added to the broken gelled oil (the baseline oil plus the NaOH solution) while blending. The fluid appeared more and more viscous in the blender, and the vortex closed within minutes. The fluid gradually turned into a more viscous gel as the mixing continued, the gel viscosity eventually reaching the maximum (or near maximum) for the composition, which was measured at RT with a Fann 35 to be:

162 cP at 170/s shear; 66 cP at 511/s shear.

The time it would take to recover to at least near maximum viscosity in the field depends at least upon the nature of the components, their concentrations, the mixing energy, and the temperature. Considering that the addition of the NaOH solution and the HCl solution to the baseline gelled oil diluted the baseline gelled oil, the recovery of the fluid viscosity was considered to be nearly 100%.

EXAMPLE 2

Gelled Oil Crosslinked with the Ferric (Fe3+) Compound

The baseline gelled oil was prepared with #2 diesel, 5 gpt of an alkyl phosphate ester, and 5 gpt of a ferric crosslinker solution, in which the ferric ion is believed to be chelated. The phosphate ester is believed to have been made by contacting phosphorus pentoxide with an alkyl phosphate in the presence of an alcohol, where the alkyl groups are the same or different and have at least four carbon atoms, generally from about 4 to about 16 carbon atoms or mixtures or combinations thereof, where one or more of the carbon atoms can be replaced with a hetero atom selected from oxygen and nitrogen. The phosphate ester product is believed to be a mixture of PO(OR)$_3$, PO(OR)$_2$(OH) and PO(OR)(OH)$_2$, with little or no PO(OR)$_3$, where the R group is derived from either the trialkyl phosphate or from the alcohol. The viscosity of the gel at RT was measured with a Fann 35 viscometer to be:

105 cP at 170/s shear; 51 cP at 511/s shear.

Then 4 gpt of a 30 wt % NaOH solution was added to the baseline gelled oil while blending. The gelled oil quickly lost its viscosity in the blender, and changed from a gel to a thin liquid. The viscosity of the thin liquid at RT was measured with a Fann 35 to be:

12 cP at 170/s shear; 12 cP at 511/s shear (suggesting that it was a Newtonian liquid).

Then 10.5 gpt 15 wt % HCl was added to the gelled oil (the baseline gelled oil plus the NaOH solution) while blending. The fluid appeared more and more viscous in the blender, and the vortex closed within minutes. The fluid gradually turned into a more viscous gel as the mixing continued, the gel viscosity eventually reaching the maximum (or near maximum) for the composition, which was measured at RT with a Fann 35 to be:

93 cP at 170/s shear; 46 cP at 511/s shear.

Considering that the addition of the NaOH solution and the HCl solution to the baseline gelled oil diluted the baseline gelled oil, the recovery of the fluid viscosity was considered to be nearly 100%.

EXAMPLE 3

Gelled Oil Crosslinked with the Aluminum Compound

The baseline gelled oil was prepared with #2 diesel, 6 gpt of a phosphate ester solution, and 1.8 gpt of an aluminum crosslinker solution. The phosphate ester solution was a mixture of 80% of a mixture of ethyl, octyl and decyl esters of phosphoric acid and 20% of an aromatic hydrocarbon solvent. The aluminum crosslinker solution was a mixture of about 24% 2-ethylhexan-1-ol and 59% aluminum triisopropanolate and 17% diesel oil. All amounts given are for as-received materials. The viscosity of the gel at RT was measured with a Fann 35 viscometer to be:

174 cP at 170/s shear; 86 cP at 511/s shear.

Then 4 gpt of 30 wt % NaOH solution was added to the baseline gelled oil while blending. The gelled oil quickly lost its viscosity in the blender, and changed from a thick gel to a thin liquid. 10.5 gpt 15 wt % HCl was then added to the gelled oil (the baseline gelled oil plus the NaOH solution) while blending. The fluid gradually turned into a more viscous gel as the mixing continued, the gel viscosity eventually reaching the maximum (or near maximum) for the composition, which was measured at RT with a Fann 35 to be:

78 cP at 170/s shear; 42 cP at 511/s shear.

Gelled oils crosslinked with aluminum compounds are often sensitive to water contamination, which might be the reason why the gelled oil in this example lost a large percentage of its viscosity. However, this gelled oil may still be reusable as it does retain significant portion of its initial viscosity. If more concentrated or solid NaOH and more concentrated HCl had been used, the impact of the water would have been reduced, and the viscosity of the recycled gelled oil would have been higher.

Any element in the examples may be replaced by any one of numerous equivalent alternatives, only some of which are disclosed in the specification. Although only a few example embodiments have been described in detail above, those skilled in the art will readily appreciate that many modifications are possible in the example embodiments without materially departing from the concepts described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

I claim:

1. A method of treating a subterranean formation penetrated by a wellbore comprising:
    preparing a gelled oil at the surface,
    performing a first cycle comprising injecting the gelled oil into a well through coiled tubing, recovering the gelled oil at the surface, reducing the viscosity of the recovered oil by adding a first pH-adjusting agent, treating the resulting fluid having reduced viscosity, increasing the viscosity of the treated fluid by adding a second pH-adjusting agent to reestablish the gel, and
    starting a second cycle by re-injecting the gelled oil into the well through coiled tubing.

2. The method of claim 1 wherein the gelled oil comprises a hydrocarbon mixture, a gelling agent, and a crosslinking agent.

3. The method of claim 1 wherein the treatment is wellbore cleanout.

4. The method of claim 1 wherein the treatment is drilling.

5. The method of claim 1 wherein the step of treating the resulting
    fluid having reduced viscosity comprises removing solids from the resulting
    fluid having reduced viscosity.

6. The method of claim 1 wherein the first pH-adjusting agent comprises a base.

7. The method of claim 1 wherein the second pH-adjusting agent comprises an acid.

8. The method of claim 1 wherein the gelled oil comprises (a) diesel, (b) a phosphate ester and (c) a ferrous compound, a ferric compound or an aluminum compound.

9. The method of claim 1 wherein the step of increasing the viscosity of the treated fluid comprises adding a gelling agent, a crosslinking agent, or both.

10. A method of cleaning out a wellbore penetrating a subterranean formation, said method comprising:
    injecting through coiled tubing a gelled oil into the wellbore,
    entraining a solid from the wellbore,
    recovering the gelled oil at the surface,
    removing the solid from the gelled oil by adding a first pH-adjusting agent to reduce the viscosity of the resulting fluid relative to the gelled oil,
    increasing the viscosity of the resulting fluid by adding a second pH-adjusting agent to reestablish the gel, and re-injecting the gelled oil into the well through coiled tubing.

11. The method of claim 10 wherein the gelled oil comprises a hydrocarbon mixture, a gelling agent, and a crosslinking agent.

12. The method of claim 10 wherein the first pH-adjusting agent comprises a base.

13. The method of claim 10 wherein the second pH-adjusting agent comprises an acid.

14. The method of claim 10 wherein the gelled oil comprises (a) diesel, (b) a phosphate ester and (c) a ferrous compound, a ferric compound or an aluminum compound.

15. The method of claim 10 wherein the step of increasing the viscosity of the resulting fluid comprises adding a gelling agent, a crosslinking agent, or both.

* * * * *